March 14, 1950     T. K. RIGGEN     2,500,433
PENDULUM CLOCK
Filed April 29, 1946     2 Sheets-Sheet 1
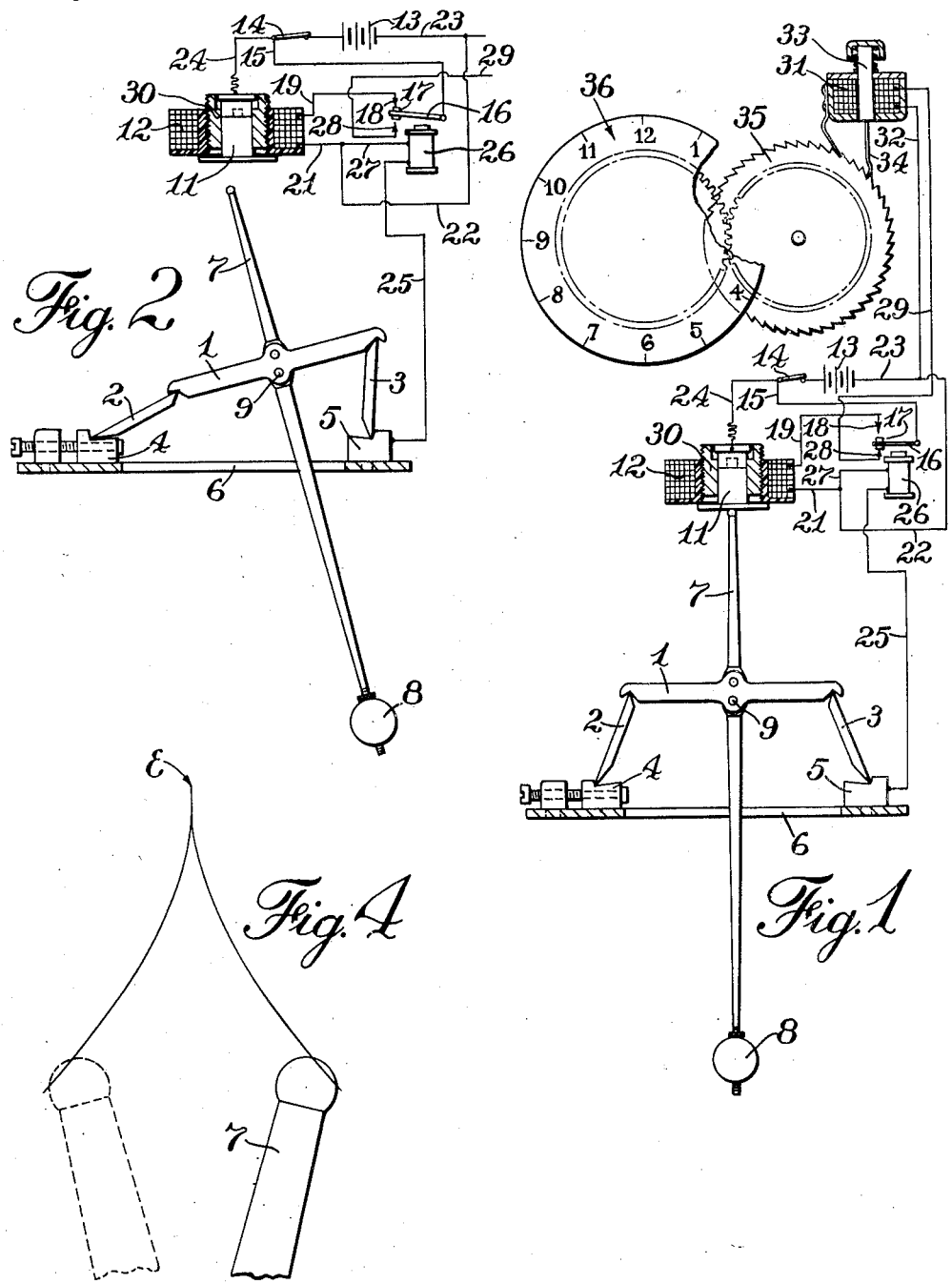
WITNESS:
Esther M. Stockton
INVENTOR.
Theodore K. Riggen
BY
Clinton S. Janes
ATTORNEY March 14, 1950

T. K. RIGGEN 2,500,433

PENDULUM CLOCK

Filed April 29, 1946

INVENTOR.
Theodore K. Riggen
BY
Clinton S. James
ATTORNEY

WITNESS:
Esther M. Stockton

Patented Mar. 14, 1950

2,500,433

UNITED STATES PATENT OFFICE 2,500,433

PENDULUM CLOCK

Theodore K. Riggen, Elmira, N. Y., assignor to Bendix Aviation Corporation, a corporation of Delaware Application April 29, 1946, Serial No. 665,698

4 Claims. (Cl. 58—29)

The present invention relates to a mechanical movement and more particularly to the embodiment of such a mechanical movement in a chronometric device.

In time measuring instruments employing a pendulum, it has been found conducive to accuracy to employ a pendulum having a long period of vibration, and to apply thereto the impulses necessary to overcome frictional losses, during that part of the swing when the pendulum bob is moving the fastest. On the other hand, the conventional type of pendulum having a period of vibration of a second or more is cumbersome, and subject to significant changes of length due to temperature variations; moreover, the usual forms of escapement mechanism transmit power to such pendulum chiefly during the end portions of its swing when it is traveling comparatively slowly.

It is an object of the present invention to provide a novel mechanical movement involving pendulum motion having a long period of vibration in which the elements are of small physical dimensions.

It is another object to provide such a device in which the impulses for maintaining the pendulum in motion are applied to the pendulum when it is moving substantially at its highest rate of speed.

It is another object to provide such a device in which the successive impulses to the pendulum are identical in character and amount of energy.

It is another object to provide such a device in which the energy of said impulses may be readily adjusted to exactly compensate the frictional losses in the mechanical movement.

It is another object to provide such a device in which the pendulum is controlled entirely by gravity, without the use of springs of any kind.

Further objects and advantages will be apparent from the following description taken in connection with the accompanying drawing in which:

Fig. 1 is a semi-diagrammatic illustration of a preferred embodiment of the invention as incorporated in a chronometric device;

Fig. 2 is a detail of the mechanical movement showing the pendulum at the limit of its swing away from vertical position;

Fig. 4 is an enlarged diagram plotting the motion of the top of the pendulum rod during vibration thereof.

Figure 3:
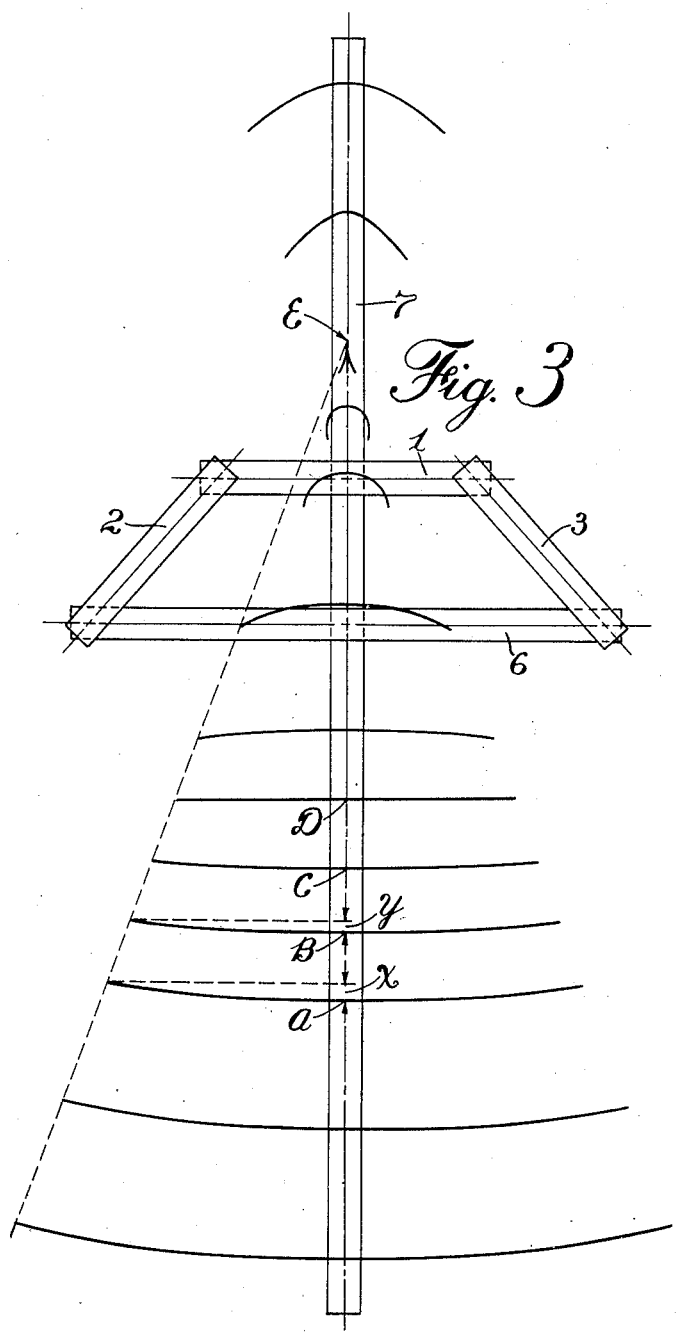
Fig. 3 is a diagram showing the paths traversed by longitudinally spaced points on the pendulum member as it oscillates.

In Fig. 1 of the drawing, there is illustrated a normally horizontal bar 1 which is supported at its ends by rocker links 2 and 3 arranged in downwardly divergent relation, terminating in knife edges which rest in grooved blocks 4, 5 mounted on any suitable fixed base 6. A pendulum rod 7 having a bob 8 at its lower end is fixed as indicated at 9 to the center of the bar 1 perpendicularly thereto. The pendulum so constructed swings bodily in the manner indicated in Fig. 2, so that the bob 8 traverses a path which is but slightly curved as shown in Fig. 3 and accordingly the period of vibration is very long compared with the physical dimensions of the pendulum.

Thus, for example, the period of vibration of a pendulum has been found to be approximately one second when the bar 1 is two inches long, the links 2 are one and one-half inches long, the distance between the grooves in the blocks 4 and 5 is four inches, and the bob 8 is located four inches below the bar 1. Since the length of an ordinary simple pendulum having a period of vibration of one second is about nine and three-quarters inches, the reduction in physical dimensions accomplished by the present mechanical movement will be appreciated.

Another feature of this mechanical movement is that it may be so arranged that shortening the pendulum retards the velocity of swing instead of accelerating the swing as in an ordinary pendulum. An examination of Fig. 3 shows why this is so. If the pendulum bob is located at the point A on the vertical bar 7 corresponding to the dimensions given above as an example, the curvature of its path is such that it is raised through a vertical distance X at the end of its swing, and the potential energy so stored up is available to accelerate the bob toward its midposition. If the bob is placed at the point B, the corresponding distance Y is appreciably less than X and this reduction is continued when the bob is raised further, as to points C and D at which latter point the motion of the bob approximates a straight line.

At points above D, the locus of a point on the bar 7 becomes upwardly convex, the convexity increasing until the upper end E of the bar 7 describes a narrow cusp or spire so that it moves substantially in a vertical direction while the pendulum is passing through the midportion of its swing. According to the present invention, advantage is taken of this fact to apply to the pendulum, when the bob is moving most rapidly, those impulses of energy necessary to overcome friction. As shown in Fig. 1, the pendulum rod 7 is terminated at its upper end at the point mentioned where the motion is in accordance with the graph of the point E shown in Fig. 4. A small weight member 11 is positioned to be arranged adjacent to the upper end of the bar 7 and means are provided for controlling the weight so as to drop it on the end of the bar as the bar passes through its mid-position. For this purpose, the weight is preferably formed as the magnetic core of a solenoid 12, energization of which raises the weight 11 to a position where it is engaged by the pendulum rod 7 only at its uppermost position.

In order to actuate the weight 11, a battery 13 is connected by a switch 14 through lead 15 to a relay armature 16 carrying a contact 17. Contact 17 normally engages a corresponding contact 18 which is connected by a lead 19 to one terminal of the solenoid 12. The opposite terminal of the solenoid is connected by leads 21, 22 and 23 to the battery 13 to complete a circuit for energizing the solenoid. Means for controlling the relay contacts 17, 18 are provided comprising a lead 24 from the switch 14 to the weight member 11, a lead 25 from the base block 5 to relay coil 26, and lead 27 from the relay coil to the lead 22 which is connected to the battery lead 23. The parts of the mechanical movement are made of conductive material so that when the pendulum rod 7 touches the weight member 11, a circuit is completed through the electromagnet 26 which thereupon opens contacts 17, 18, thus deenergizing the solenoid 12 and permitting the weight 11 to rest on the top of the pendulum bar 7 during its downward movement. The downward movement of the weight member 11 is limited by a stop member 30 which is adjustable in order to readily and accurately regulate the amount of energy imparted to the pendulum during each vibration thereof.

In order to utilize the mechanical movement as a chronometric device, a third contact 28 is provided on the relay which contact is engaged by the movable contact 17 when the relay is energized. Contact 28 is connected by lead 29 with one terminal of a solenoid 31, the opposite terminal of which is connected by a lead 32 to the battery lead 23. A plunger 33 actuated by the solenoid 31 has an extension 34 which engages a tooth of a ratchet wheel 35 whereby the ratchet wheel is stepped forward one tooth each time that the solenoid 31 is energized. Backward movement of the ratchet wheel 35 is prevented by a spring pawl and the ratchet wheel is suitably geared to a clock mechanism indicated generally at 36 so as to record the passage of time as measured by the vibration of the mechanical movement.

In operation, starting with the parts in the positions shown in Fig. 1, switch 14 is closed and the pendulum 8 is displaced from its center position by the operator in order to initiate vibration thereof. Since the pendulum rod 7 initially engages weight 11, the relay coil 26 is energized, whereby the circuit of solenoid 12 is opened at 17, 18, and the weight 11 follows the downward movement of the top of the rod 7. When the downward movement of the weight 11 is stopped by the abutment 30, the electrical contact between the pendulum bar 7 and the weight member is broken, thus breaking the circuit of relay coil 26, permitting contacts 17, 18 to close. This completes the circuit through the solenoid 12, energization of which raises the weight 11 to its upper position.

When the pendulum is released by the operator and swings through its mid-position, the upper end of the rod 7 rises until it touches the weight member 11, thus closing the circuit of relay coil 26, energization of which opens contacts 17, 18 and closes contacts 17, 28. The opening of contacts 17, 18 breaks the circuit of solenoid 12, thus allowing the weight to rest on the end of the pendulum rod 7 as it moves downward, imparting energy thereto. Closure of contacts 17, 28 closes the circuit of solenoid 31 causing the same to advance the ratchet wheel 35 one tooth. When the downward movement of the weight member 11 is arrested by the abutment 30, the circuit of relay coil 26 is again broken and the operation is repeated.

It will thus be seen that precisely identical impulses are applied to the pendulum twice during each complete vibration thereof and such impulses occur at the instant that the pendulum bob is passing through its mid-position and accordingly is moving at its highest rate of speed.

The abutment 30 is so adjusted as to cause the weight member 11 to supply just sufficient energy to overcome frictional losses of the pendulum as the pendulum vibrates with the desired amplitude of swing.

Adjustment of the period of the pendulum may be accomplished by adjusting the bob vertically on the bar 7, and/or by adjusting one of the base blocks laterally as indicated in Figs. 1 and 2.

Although but one embodiment of the invention has been shown and described in detail, it will be understood that other embodiments are possible and that the mechanical movement disclosed is capable of other adaptations and uses, and the dimensions thereof may be altered to secure desired results without departing from the spirit of the invention as defined in the claims appended hereto.

What is claimed is:

1. In a chronometric device, a mechanical movement comprising a normally horizontal bar, a link hinged to each end of the bar on horizontal axes, a base to which said links are hinged in divergent relation, a rigid pendulum bar fixed medially to the horizontal bar, normal thereto, extending both upwardly and downwardly therefrom, a bob adjustably mounted on the downwardly extending portion of the pendulum bar, and means for periodically applying a downward pressure on the upwardly extending portion of the pendulum bar.

2. A chronometric device as set forth in claim 1 in which the bob is spaced sufficiently below the cross bar to cause the bob to move in a path which is lowest at the mid point of its swing.

3. A chronometric device as set forth in claim 1 in which the point of application of the downward pressure on the pendulum bar is spaced vertically above the cross bar and moves in a path which is highest at its mid point.

4. A chronometric device as set forth in claim 3 in which the means for applying the downward pressure to the pendulum bar includes means for synchronizing the application of the pressure to the swing of the pendulum so that the pressure is applied as the pendulum moves away from its middle position.

THEODORE K. RIGGEN.

REFERENCES CITED

The following references are of record in the file of this patent:

UNITED STATES PATENTS

| Number | Name | Date |
|---|---|---|
| 1,937,529 | Poole | Dec. 5, 1933 |
| 2,355,054 | Carr | Aug. 8, 1944 |